Aug. 4, 1931.                R. E. KRUG                1,817,007
                             AEROPLANE
                         Filed June 17, 1929
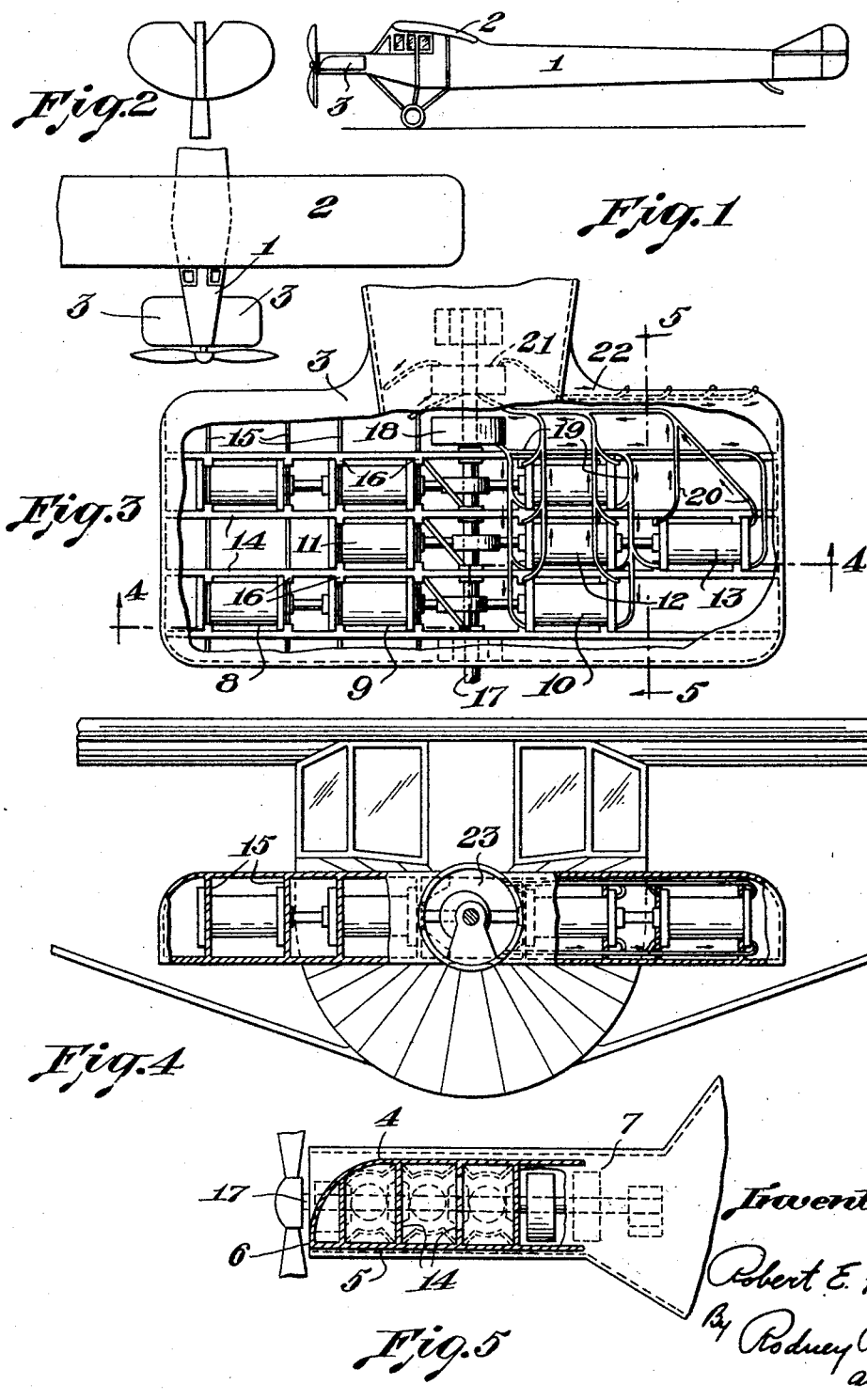

Patented Aug. 4, 1931

1,817,007

UNITED STATES PATENT OFFICE

ROBERT E. KRUG, OF GRANITE CITY, ILLINOIS

AEROPLANE

Application filed June 17, 1929. Serial No. 371,535.

My invention relates to aeroplanes and consists in a novel arrangement of fuselage, motor housing element and motor.

It has been customary to mount the motor of an aeroplane on the exterior of the fuselage, in the fuselage or in separate housing elements distinct from the fuselage. In the latter case, the motor housing elements have been either supported by or suspended from the wing of the aeroplane.

The width of the fuselage is necessarily limited by the factor of wind resistance; consequently engines that are to be housed wholly in the fuselage should be limited in their dimensions transversely and vertically of the fuselage. Therefore certain types of engines, such as horizontal engines are objectionable where the engine is to be placed wholly within the fuselage. Further, it would be impractical to house more than one motor in the same lateral plane and wholly within the fuselage. Even if the motors were adjacent to each other, the fuselage would have to be so wide as to seriously impair the efficiency of the ship, but the radius of the propellers would necessitate placing these motors a substantial distance apart and thus require a veritable scow of a fuselage.

I believe that no one, prior to my invention, has used a horizontal engine as a power unit for an aeroplane. The restriction on the width of the fuselage made the use of this type of motor prohibitive.

When desiring to use more than one engine in an aeroplane, the industry has heretofore adopted the expedient of having the engines themselves or their housing elements either supported by or suspended from the wing of the aeroplane. When an odd number of engines were used, one engine could be mounted in the fuselage.

The wing of an aeroplane has heavy enough duty without the additional strain of directly mounted vibrating motors thereon. When the motors are mounted on the wings, they must be positioned far enough away from the fuselage to permit revolution of the propellers. The farther out on the wing the motors are placed, the greater the tendency of the weight of the motors to bow the wing downwardly and of the vibration of the motors to set up a sympathetic vibration in the wing. These two forces are apt to work the wing loose. The wing supports the whole weight of the aeroplane in any case, but when the motors are mounted on the fuselage or some other element independent of the wing, the strain is distributed over the whole of the wing, and the weight of the motors does not tend to bow the wing downwardly. The strain is in the opposite direction and the aerofoil construction of the wing, with its upwardly convexed arch with the ordinary reinforcements will keep the wing from folding upwardly.

In my copending application, Serial No. 465,735, filed July 3, 1930, I describe an aeroplane structure in which an engine similar to the one described herein is mounted partly in the fuselage and in the adjacent portions of the wings and such structure is one way of avoiding some of the difficulties and attaining some of the objects referred to above.

One of the objects of my present invention is to provide one or more fins of aerofoil sections built directly on the fuselage frame and forming extensions thereof and preferably located forwardly of the wing of the aeroplane and adapted to house a horizontal motor.

Another object of my invention is to provide aerofoil fins on the fuselage, independent of the wing, capable of housing motor structure projecting laterally from the fuselage, thereby to eliminate the above mentioned problems heretofore present in the housing of a number of motors in one aeroplane.

In the accompanying drawings which illustrate a selected embodiment of my invention—

Figure 1 is a side view of an aeroplane embodying my invention.

Figure 2 is a top view of the aeroplane with a portion of the fuselage and wing cut away but showing the relation thereto of my fins.

Figure 3 is a top view of my lateral fins on an enlarged scale with their upper walls removed and showing a horizontal engine housed in the same and in the adjacent portion of the fuselage.

Figure 4 is partly a front view of the structure shown in Figure 3 and partly a vertical section taken on the line 4—4 of Figure 3.

Figure 5 is a transverse vertical section through one of my lateral fins taken on the line 5—5 of Figure 3.

I illustrate a monoplane having a fuselage 1 and a wing 2 of any usual design. Lateral projections 3 on the fuselage form nacelles or fins preferably, but not necessarily, located forwardly of the wing 2 and have upper walls 4 and lower walls 5. These walls converge at 6 in a line perpendicular to the fuselage to form the noses of the fins, and the fins are open at the back as indicated at 7.

An opening 23 in the front end of the fuselage admits air into the fuselage and the fins which air passes over the motor, cooling the same, and out the rear of the fins. The volume of the air stream is increased as the speed of the motor and plane is increased, thus the cooling agency is most effective when the motor is generating the greatest amount of heat.

As shown in Figure 2, these fins and the fuselage are adapted to house a horizontally disposed motor of the type described in my copending application Serial Number 385,114 filed August 12, 1929. The cylinders in the motor illustrated lie in rows of three cylinders in each row, two cylinders 8 and 9 in the first row being housed in one fin and one cylinder 10 in the other fin, the next row having one cylinder 11 in the first mentioned fin and two cylinders 12 and 13 in the latter fin. This arrangement of cylinders is carried throughout the motor so that in any three adjacent rows of cylinders, one fin will house two outside rows of two cylinders each and an inside row of one cylinder, while the other fin will house two outside rows of one cylinder each and an inside row of two cylinders. The propeller shaft 17 is mounted in the fuselage between opposed cylinders.

The cylinders are supplied with a scavenging and cooling stream of compressed air from pump 18 through pipes 19 and this air and products of combustion are drawn from the cylinders through pipes 20 by means of pump 21 and discharged by pipes 22 through the open ends 7 of the fins 3.

The fins 3 are of aerofoil section and are built directly on to the frame of the fuselage. They are restricted in length, width and height. These dimensions are just great enough to permit the housing of the motor or motors therein. Being restricted in width and length, the fins are not subject to vibrations due to air pressures that the larger surfaced wings must withstand. Hence the motor is freed from destructive tendencies arising from vibrations and the cradling of the motor is more easily and effectively provided. The restrictions of all of the dimensions, particularly the height, and the fact that the fins are of aerofoil section tend to reduce as far as possible all parasitic resistence.

Thus, the fins tend to act as aids to the wings in the matter of buoyancy without greatly interfering with the speed of the craft.

The fins are braced by longitudinal and transverse members 14 and 15 of plate or open girder type and are flanged as indicated at 16 to provide mountings for the engine cylinders.

It is obvious that these fins could be placed anywhere along the line of the fuselage, that any type of motor might be used within them, or that modifications might be made in the construction of the fins themselves, such as closing the rear end or changing the shape of the nose without departing from the spirit of my invention. I contemplate the exclusive use of any modifications of my invention which come within the scope of my claims.

I claim:

1. In combination, an aeroplane fuselage, a plane mounted thereon, a laterally projecting fin on said fuselage spaced from said plane, said fin being of restricted height relative to the height of said fuselage, and an aeroplane driving motor housed in said fin and said fuselage.

2. In combination, an aeroplane fuselage, a plane mounted thereon, a laterally projecting fin on said fuselage forward of said plane, and an aeroplane driving motor housed in said fin and said fuselage.

3. In combination, an aeroplane fuselage, a plane mounted thereon, a laterally projecting fin on said fuselage spaced vertically from said plane, and an aeroplane driving motor housed in said fin and said fuselage.

4. In combination, an aeroplane fuselage, a plane mounted thereon, a laterally projecting fin on said fuselage forward of and spaced vertically from said plane, and an aeroplane driving motor housed in said fin and fuselage.

5. In combination, an aeroplane fuselage, a motor partly enclosed in said fuselage but exceeding in width the width of the fuselage, extensions on said fuselage for receiving the portion of said motor projecting beyond said fuselage, said extensions being stream lined.

6. In combination, an aeroplane fuselage, a transversely extending fin on said fuselage having upper and lower walls, said walls converging at their forward ends to provide an edge extending transversely of the fuselage and a motor contained in part in said fin and in part in said fuselage.

7. In combination, an aeroplane fuselage, a fin on said fuselage having upper and lower walls, a motor housed in said fuselage and fin, a means for supplying said motor with a stream of compressed air, the rear of said fin being open to provide for the discharge of said air stream from said motor.

8. In combination, an aeroplane fuselage, a transversely extending fin on said fuselage having upper and lower walls, a motor housed in said fuselage and fin, there being an opening in the nose of said fuselage admitting air to said fuselage and fin to cool said motor, the rear of said fin being open to provide for the discharge of said air stream from said motor.

9. In combination, an aeroplane fuselage, a plane mounted thereon, a laterally projecting fin on said fuselage forward of said plane, a propeller shaft mounted in said fuselage, engine cylinders housed in said fin, and pistons in said cylinders operatively connected to said shaft.

10. In combination, an aeroplane fuselage, laterally projecting fins thereon, a propeller shaft mounted in said fuselage, horizontally disposed engine cylinders housed in said fins, and pistons in said cylinders operatively engaging said shaft.

11. In combination, an aeroplane fuselage, a plane mounted thereon, laterally projecting fins on opposite sides of said fuselage spaced from said plane, said fins being aerofoil sections, a propeller shaft mounted in said fuselage, a motor having horizontal cylinders housed in both of said fins, and means providing operative engagement between said motor and said shaft.

12. In combination, an aeroplane fuselage, a plane mounted thereon, laterally projecting fins on opposite sides of said fuselage spaced from said plane, said fins being aerofoil sections, a propeller shaft mounted in said fuselage, a motor including at least two horizontally disposed cylinders with their axes aligned, the cylinders of said motor being housed in both of said fins.

13. In combination, an aeroplane fuselage, a plane mounted thereon, laterally projecting fins on opposite sides of said fuselage spaced from said plane, said fins being aerofoil sections, a propeller shaft mounted in said fuselage, a motor including at least two horizontally disposed cylinders, two of said cylinders being housed in one of said fins.

14. In combination, an aeroplane fueslage, laterally projecting fins on said fuselage, said fins being aerofoil sections, a motor housed in said fueslage and fins, the shaft of said motor being mounted in said fuselage, the cylinders of said motor being disposed horizontally in opposed positions in said fins in a plurality of rows of three cylinders in each row and arranged perpendicularly to the shaft, said rows alternatively having one cylinder in one fin and two in the opposing fin and two in the first mentioned fin and one in the second mentioned fin.

15. In combination, an aeroplane fuselage, a wing mounted thereon, laterally projecting fins on opposite sides of said fuselage spaced from said wing, said fins being aerofoil sections, a propeller shaft mounted in said fuselage a motor for driving said shaft and including at least two horizontally disposed cylinders, one of said cylinders being housed in one of said fins.

16. In combination, an aeroplane fuselage, a laterally projecting fin on said fuselage, a motor supporting elements in said fuselage and fin, said fuselage and fin being adapted to house an aeroplane driving motor.

17. In combination, an aeroplane fuselage, laterally projecting fins on opposite sides of said fuselage, and motor supporting elements in said fuselage and fins, said fuselage and fins being adapted to cooperate to house a horizontally disposed motor.

18. In combination, an aeroplane fuselage, a laterally projecting fin on said fuselage, and a motor supporting framing in said fuselage and fin, said fuselage and fin being large enough to house an aeroplane driving motor mounted on said motor supporting framing.

19. In combination an aeroplane fuselage, a laterally projecting fin on said fuselage, and a motor supporting framing comprising transverse members extending through said fuselage into said fin, said fuselage and fin being large enough to enclose an aeroplane driving motor mounted on said motor framing.

20. In combination an aeroplane fuselage, a laterally projecting fin on said fuselage, and a motor supporting frame comprising transverse members extending through said fuselage into said fin and longitudinal members in said fuselage and fin intersecting said transverse members, said fuselage and fin being large enough to enclose an aeroplane driving motor mounted on said motor supporting frame.

21. In combination, an aeroplane fuselage, a fin on said fuselage having upper and lower walls, a motor housed in said fuselage and fin, means for supplying said motor with a stream of air, the rear of said fin being open to provide for the discharge of said air stream from said motor.

22. In combination, an aeroplane fuselage, a plane mounted thereon, a laterally projecting fin on said fuselage spaced from said plane, a propeller shaft mounted in said fuselage, engine cylinders housed in said fin, and pistons in said cylinders operatively connected to said shaft.

23. In combination, an aeroplane fuselage, a plane mounted thereon, a laterally projecting fin on said fuselage spaced horizontally from said plane, a propeller shaft mounted on said fuselage, engine cylinders housed in said fin, and pistons in said cylinders operatively connected to said shaft.

In testimony whereof I hereunto affix my signature this 12th day of June, 1929.

ROBERT E. KRUG.